US011150735B2

United States Patent
Ma et al.

(10) Patent No.: US 11,150,735 B2
(45) Date of Patent: Oct. 19, 2021

(54) HAPTIC TOUCH BUTTONS WITH SENSORS FOR DEVICES

(71) Applicant: Hewlett-Packard Development Company, L.P., Spring, TX (US)

(72) Inventors: Xiang Ma, Houston, TX (US); Ricky Thomas Burks, Houston, TX (US); Mats Anders Krister Luckman, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,358

(22) PCT Filed: Dec. 4, 2017

(86) PCT No.: PCT/US2017/064429
§ 371 (c)(1),
(2) Date: Jul. 26, 2019

(87) PCT Pub. No.: WO2019/112545
PCT Pub. Date: Jun. 13, 2019

(65) Prior Publication Data
US 2020/0285321 A1    Sep. 10, 2020

(51) Int. Cl.
*G06F 3/041* (2006.01)
*G06F 3/045* (2006.01)
*G06F 3/01* (2006.01)

(52) U.S. Cl.
CPC .............. *G06F 3/017* (2013.01); *G06F 3/016* (2013.01); *G06F 3/0416* (2013.01); *G06F 2203/04104* (2013.01); *G06F 2203/04108* (2013.01)

(58) Field of Classification Search
CPC .......... G06F 3/016; G06F 3/041; G06F 3/044
See application file for complete search history.

(56) References Cited

U.S. PATENT DOCUMENTS

| | | | |
|---|---|---|---|
| 7,656,393 B2 | 2/2010 | King et al. | |
| 8,723,824 B2 | 5/2014 | Myers et al. | |
| 9,436,281 B2 | 9/2016 | Pasquero et al. | |
| 9,471,143 B2 | 10/2016 | Feng et al. | |
| 2007/0132740 A1* | 6/2007 | Meiby | G06F 3/0213 345/173 |
| 2010/0078343 A1 | 4/2010 | Hoellwart et al. | |
| 2011/0087963 A1 | 4/2011 | Brisebois et al. | |
| 2011/0122085 A1 | 5/2011 | Chang | |
| 2011/0167391 A1 | 7/2011 | Momeyer et al. | |

(Continued)

OTHER PUBLICATIONS

Kim, et al., Haptic Feedback Design for a Virtual Button Along Force-displacement Curves, Oct. 8-11, 2013, https://dl.acm.org/citation.cfm?id=2502041.

*Primary Examiner* — Nan-Ying Yang
(74) *Attorney, Agent, or Firm* — Tong, Rea, Bentley & Kim LLC

(57) ABSTRACT

In example implementations, an apparatus is provided. The apparatus includes a housing, a haptic touch button, a sensor and a processor. The haptic touch button is coupled to a perimeter of the housing. The sensor is located inside of the housing. The processor is located inside of the housing and communicatively coupled to the haptic touch button and the sensor. The processor translates an input from the haptic touch button and an input from the sensor into a finger action.

12 Claims, 3 Drawing Sheets

(56) References Cited

U.S. PATENT DOCUMENTS

| | | | |
|---|---|---|---|
| 2012/0075173 A1* | 3/2012 | Ashbrook | G06F 3/014 |
| | | | 345/156 |
| 2014/0266812 A1* | 9/2014 | Rajkowski | G06F 3/0234 |
| | | | 341/22 |
| 2017/0010780 A1* | 1/2017 | Waldron, Jr. | G06F 3/04883 |
| 2017/0011210 A1* | 1/2017 | Cheong | G06F 21/32 |
| 2017/0060320 A1 | 3/2017 | Li et al. | |
| 2018/0224990 A1* | 8/2018 | Shim | G06F 3/0484 |

* cited by examiner

100

HAPTIC TOUCH BUTTONS WITH SENSORS FOR DEVICES

BACKGROUND

Mobile devices are used by consumers to consume media, to enhance productivity, and the like. The mobile devices can include a physical button to perform a particular function. For example, the mobile device may include a physical button for powering on the device, a home button, a physical button to turn the volume up and down, a mute switch, and the like. The functions of these physical buttons are typically set by the manufacturer and cannot be reprogrammed.

DETAILED DESCRIPTION

Examples described herein provide devices having haptic touch buttons with sensors. As discussed above, devices may have physical buttons assigned to perform a particular function. The function performed by the physical button is assigned by the manufacturer and usually cannot be changed.

The present disclosure provides a device having a haptic touch button that can be used to perform a variety of different functions that can be customized by a user. The haptic touch button may work with a sensor to detect different finger actions that are associated with different functions. A haptic actuator may be used with the haptic touch button to provide feedback. Different actuations or movements of the haptic actuator may be assigned as feedback to different functions.

Figure 1:
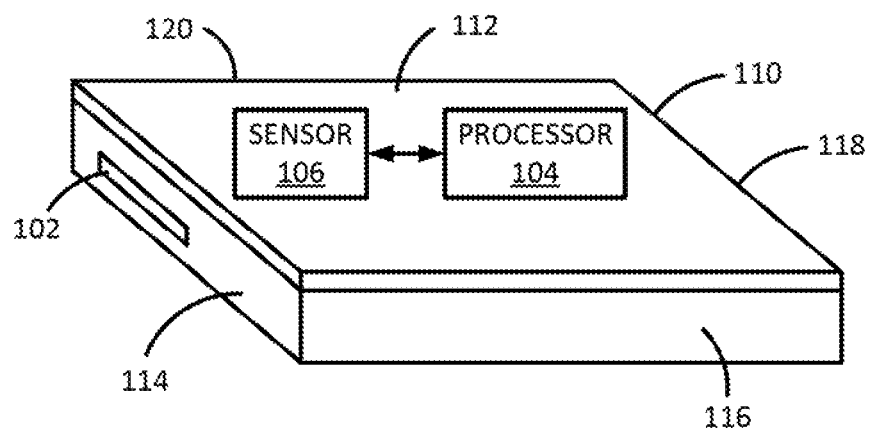
FIG. 1 is a block diagram of an example of an apparatus having a haptic touch button of the present disclosure.

FIG. 1 illustrates an example apparatus 100 of the present disclosure. In one example, the apparatus 100 may be a mobile device such as a laptop computer, a tablet computer, and the like. The apparatus 100 may have a haptic touch button 102. The haptic touch button 102 may be communicatively coupled to a processor 104. The processor 104 may also be communicatively coupled to a sensor 106.

In one example, the apparatus 100 may have a housing 110. The housing 110 may enclose the sensor 106 and the processor 104. The housing 110 may be fabricated from any type of plastic, metal, metalloid, metalized plastic, anodized metal, and the like.

FIG. 1 illustrates a top side 112 of the housing 110. The housing 110 may also have a perimeter that includes a left side 114, a front side 116, a right side 118, and a back side 120. In other words, the perimeter may be defined to include a surface that is located around the apparatus 100 and located between the top side 112 and a bottom side (not shown) of the apparatus 100. In one example, the perimeter may be a surface that has a plane that is perpendicular to a surface plane of the top surface 112 and the bottom surface of the apparatus 100. The left side 114 and the front side 116 are visible in FIG. 1.

In one example, the haptic touch button 102 may be located along the perimeter of the housing 110. For example, in FIG. 1, the haptic touch button 102 is located along the left side 114. The haptic touch button 102 may be positioned such that an outer most surface of the haptic touch button 102 is flush with an outer most surface of the left side 114. Thus, the haptic touch button 102 may feel even with the left side 114 of the housing 110.

In one example, the haptic touch button 102 may have a rectangular shape. However it should be noted that the haptic touch button 102 may have any type of shape.

In one example, the outer most surface of the haptic touch button 102 may be smooth or substantially flat. In another example, the outer most surface of the haptic touch button 102 may be textured. For example, the outer most surface of the haptic touch button 102 may have a plurality of protrusions, or an uneven sand paper like topology. The textured surface may allow a user to feel when he or she is touching the haptic touch button 102 without looking. As a result, the user may keep his or her eyes on a display of the apparatus 100 while providing touch inputs to the haptic touch button 102.

In one example, the processor 104 may receive an input from the haptic touch button 102 and an input from the sensor 106. For example, the haptic touch button 102 may detect when a finger is touching the haptic touch button 102 and the sensor 106 may detect a movement of the finger. Thus, the combination of the haptic touch button 102 with the sensor 106 allows the haptic touch button 102 to recognize additional finger actions of movement (e.g., directional swiping, hovering, single finger swiping, multiple finger swiping, and the like) in addition to touch movements (e.g., tapping, double tapping, holding down the button, and the like).

The processor 104 may translate the input from the haptic touch button 102 and the input from the sensor 106 into the appropriate finger action. The processor 104 may then determine a function associated with the finger action and execute the appropriate function.

In one example, the different finger actions may be customized by a user. For example, the user may assign custom functions to different finger actions via a graphical user interface (GUI) of the apparatus 100. The GUI can be displayed to the user via a display of the apparatus 100.

The finger actions can be customized for different applications. For example, for a music application or video application, a single finger swipe from front to back may be used to increase volume, a single finger swipe from back to front may be used to decrease volume, a two finger swipe from back to front may be used to advance to the next track, a two finger swipe front to back may be used to go back to the previous track, a long press (e.g., touching the haptic touch button 102 for longer than 2 seconds) may stop the current track, a quick tap (e.g., touching the haptic touch button 102 for less than 2 seconds) may pause/play the current track, and so forth.

In a spreadsheet application, a single finger swipe from front to back may be used to scroll up, a single finger swipe from back to front may scroll down, a two finger swipe from front to back may scroll right, a two finger swipe from back to front may scroll left, a touch and then hover may enable a cell selection, a long press may perform a save function, and the like.

In a video application, different finger movements may be assigned to perform different actions for the video game (e.g., weapon selection, bringing up a heads up display, scrolling through different menus, and the like). In a photo application, different finger movements may be assigned to perform different actions for taking a photograph (e.g., zooming in and out, scrolling through different photograph/video capture modes, turning a flash on/off, scrolling through and adjusting different parameters (e.g., brightness, iso settings, aperture settings, and the like).

It should be noted that the apparatus 100 has been simplified for ease of explanation and may include additional components that are not shown. For example, the apparatus 100 may include interfaces (e.g., universal serial bus (USB) interfaces, external memory card slots, graphics processors, a display, a graphical user interface, a network interface card, wireless communication radios, and the like.

Figure 2:
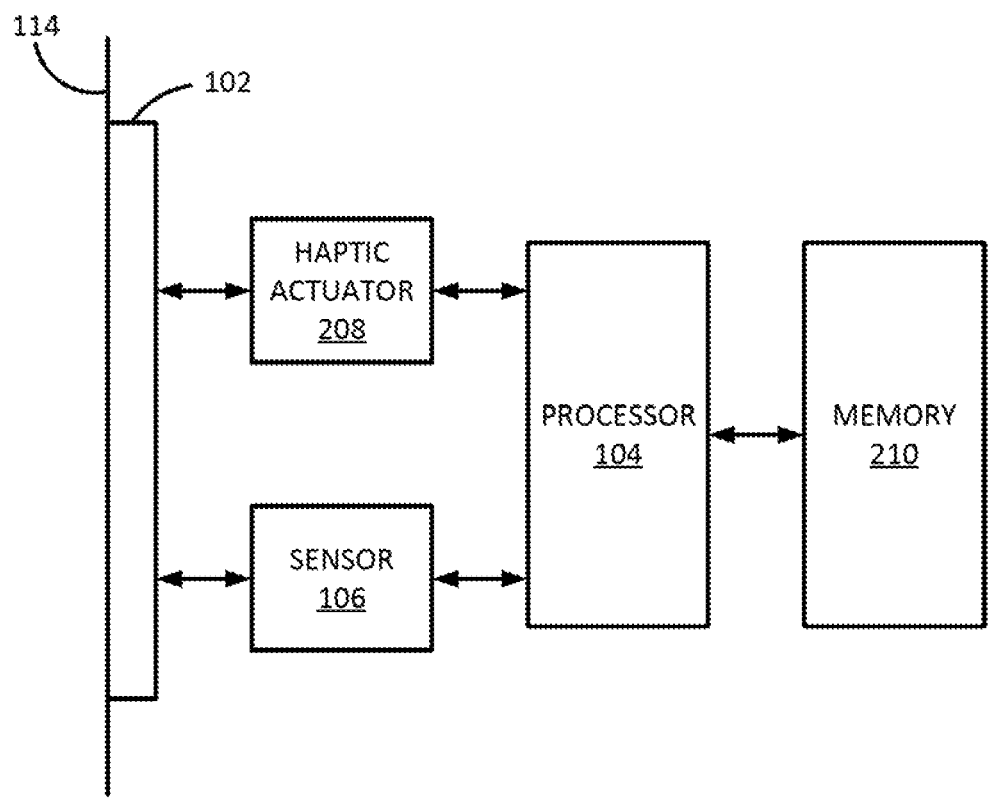
FIG. 2 is a block diagram of an example of the haptic touch button of the present disclosure.

FIG. 2 illustrates a more detailed block diagram of the haptic touch button 102. In one example, the haptic touch button 102 may be installed flush to the perimeter of the housing 110. As shown in FIG. 2, the haptic touch button 102 is installed on the left side 114 and does not protrude beyond the outer most surface of the left side 114.

In one example, the sensor 106 may be communicatively coupled to the haptic touch button 102 and the processor 104. In one example, the sensor 106 may include a plurality of different sensors or a single sensor. The sensor 106 may provide feedback of a finger presence, finger movement, a force applied by the finger to the haptic touch button 102, and the like, depending on the type of sensor or sensors 106 that are deployed.

In one example, the sensor 106 may be a contact sensor or a contactless sensor. For example, the sensor 106 may be a single contactless sensor such as an ultrasonic sensor that may be located behind the left side 114 inside of the housing 110. In another example, the sensor 106 may be a strain sensor that is located directly against the haptic touch button 102 to detect an amount of force that is applied to the haptic touch button 102. It should be noted that any type of sensors, in any combination, may be deployed inside of the apparatus 100.

In one example, a haptic actuator 208 may be communicatively coupled to the haptic touch button 102 and the processor 104. In one example, the haptic actuator 208 may be customized to provide a different feedback for different functions. The customized feedback may allow a user to know that the correct action was executed in response to the customized finger movements. For example, light feedback or vibration may be actuated in response to a short tap, a hard feedback or vibration may be actuated in response to a long tap, a vibration that moves from front to back may be actuated in response to a finger swipe from front to back, a vibration that moves from back to front may be actuated in response to a finger swipe from back to front, a pulsing vibration that moves from front to back may be actuated in response to a two finger swipe from front to back, a pulsing vibration that moves from back to front may be actuated in response to a two finger swipe from back to front, and the like.

In one example, the processor 104 may be communicatively coupled to a memory 210. The memory 210 may be any type of non-transitory computer readable medium or computer readable storage medium. For example, the memory 210 may be a hard disk drive, a read access memory (RAM), a read only memory (ROM), and the like. The memory 210 may include more than one type of memory. For example, the customized finger actions and customized haptic feedback may be stored in a hard disk drive and some fixed finger actions and haptic feedbacks may be stored in ROM.

In one example, the different finger actions and associated functions may be stored in the memory 210. The processor 104 may translate the input from the haptic button 102 and the sensor 106 into a finger action, as described above. The processor 104 may then access the memory 210 to determine which function is associated with the finger action for a particular application. In one example, a look up table, or other similar format, may be used to store each finger action with a respective function. After the processor 104 determines the correct function for the finger action for a particular application, the processor 104 may execute the function.

The processor 104 may also look up the appropriate feedback associated with the finger action. The processor 104 may then cause the haptic actuator 208 to perform the appropriate feedback that is determined to be associated with the finger action.

The design of the haptic button 102 in combination with the sensor 106 provides a smaller design than current physical buttons that may be deployed on devices. For example, the mechanical components of the physical buttons can be removed or replaced with the combination of the haptic button 102 and the sensor 106 of the present disclosure. As a result, the overall size (e.g., a thickness or z-direction) of the device may be reduced.

In addition, a single haptic button 102 in combination with the sensor 106 may be customized to perform many different functions. As a result, some physical buttons may be eliminated from the device, which may also save space, cost, and size of the device. The single haptic button 102 in combination with the sensor 106 may also consume a minimal amount of space allowing the combination to be deployed in narrow display border designs for tablet devices, notebooks, and other hybrid mobile devices.

Figure 3:
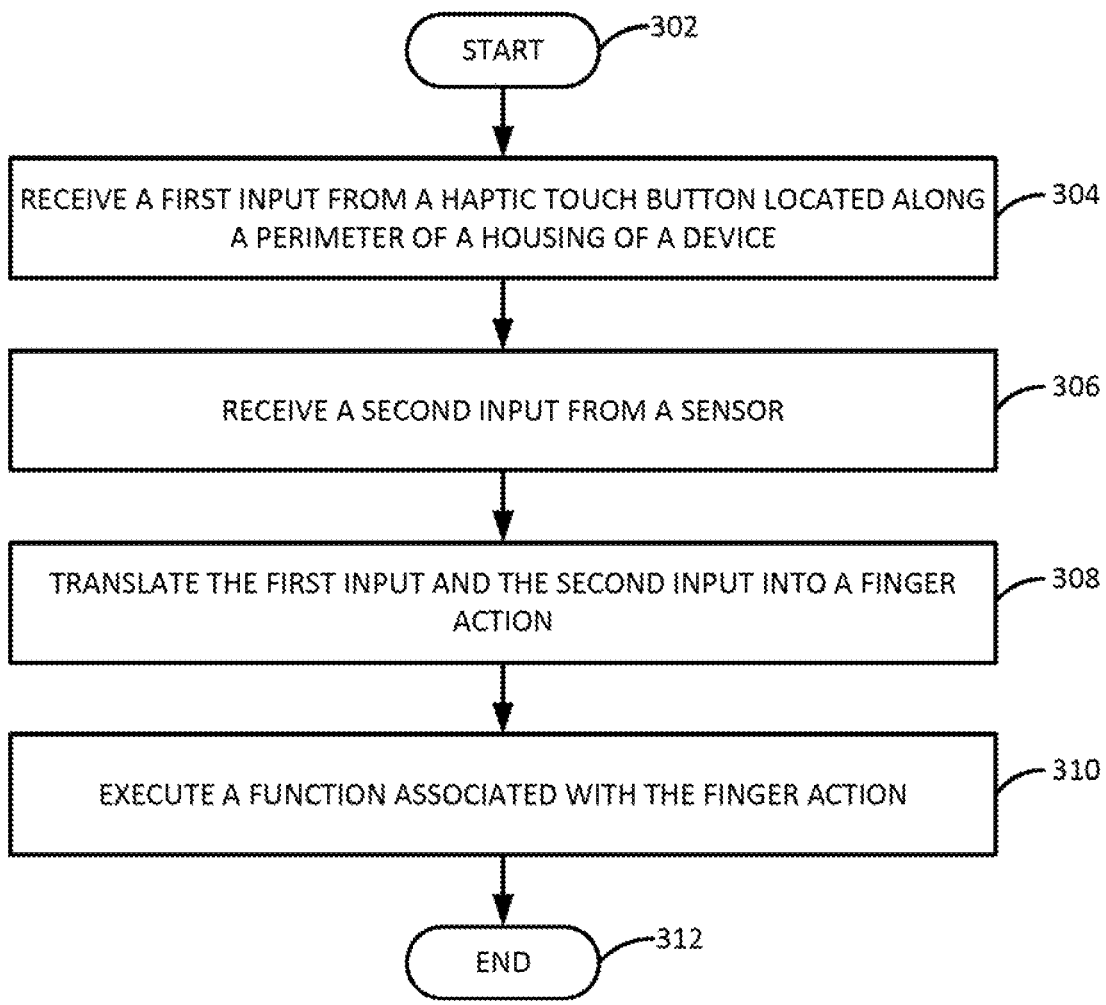
FIG. 3 is a flow chart of an example method for executing a function associated with a finger action detected on a haptic touch button.

FIG. 3 illustrates a flow diagram of an example method 300 for executing a function associated with a finger action detected on a haptic touch button. In one example, the method 300 may be performed by the apparatus 100 illustrated in FIG. 1 or the apparatus 400 illustrated in FIG. 4 below.

At block 302, the method 300 begins. At block 304, the method 300 receives a first input from a haptic touch button located along a perimeter of a housing of a device. For example, a user may touch the haptic touch button to provide the first input.

At block 306, the method 300 receives a second input from a sensor. The second input may be a touch movement detected by a contactless sensor. For example, the contactless sensor may be an ultrasonic sensor that is located adjacent to the haptic touch button behind a wall of the perimeter of the device. The touch movement may include a single finger swipe, or a multiple finger swipe.

In another example, the touch movement may be detected by contact sensors. For example, the contact sensor may be a strain sensor or a resistive sensor that can detect and amount of force that is applied by the second input, a number of taps that is provided by the second input, and the like.

In one example, the sensor may be a combination of the contactless sensor and contact sensor or a plurality of different contact sensors. In one example, the second input may be a combination of a touch movement and touch force. For example, a single finger may press down for a period of time greater than a threshold, or with greater than a predefined amount of force, and then moved from front to back.

At block 308, the method 300 translates the first input and the second input into a finger action. For example, a plurality of different finger actions may be customized to perform different actions. In one example, the different finger actions may be customized to perform different functions for different applications.

After the first input and the second input are received, the method 300 may determine the finger action that is associated with the first input and the second input. The method 300 may then determine a function associated with the finger action. In one example, the function associated with the finger action may also be based on a particular application that is being executed when the first input and the second input were received.

In one example, the functions associated with each finger action and/or application may be stored in memory. The finger action that is determined may be compared to a table that includes each finger action and associated function to determine which function is associated with the finger action.

In one example, the haptic feedback may also be stored in memory (e.g., in the same table that stores the finger actions and associated functions). The haptic feedback can be customized for each finger action and associated function, as described above. In other words, a respective haptic feedback of a plurality of different haptic feedbacks may be associated with each finger action. The method 300 may determine the correct haptic feedback that is associated with the finger action that is determined. The processor may then cause the haptic actuator to provide the haptic feedback associated with the finger action.

At block 310, the method 300 executes a function associated with the finger action. For example, if the function was to cause a display to scroll up, the screen may scroll up. If the function was to cause an e-book or electronic document to flip to the next page, the page may be flipped. If the function was to cause menu to appear and to scroll through the menu, the display may show the menu and scroll through the menu as commanded by the finger action, and so forth. At block 312, the method 300 ends.

Figure 4:
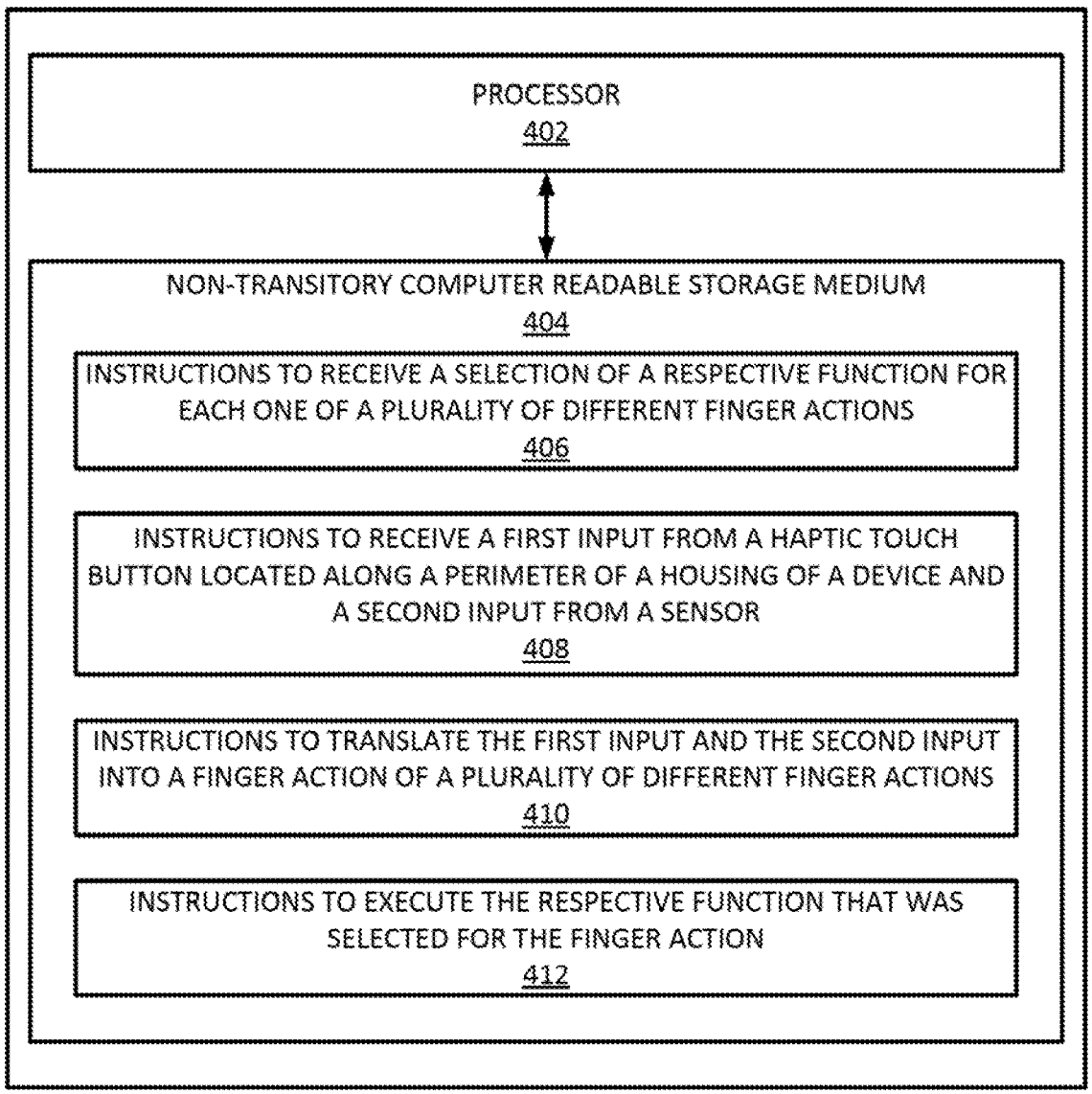
FIG. 4 is a block diagram of an example non-transitory computer readable storage medium storing instructions executed by a processor.

FIG. 4 illustrates an example of an apparatus 400. In one example, the apparatus 400 may be the apparatus 100. In one example, the apparatus 400 may include a processor 402 and a non-transitory computer readable storage medium 404. The non-transitory computer readable storage medium 404 may include instructions 406, 408, 410, and 412 that, when executed by the processor 402, cause the processor 402 to perform various functions.

The instructions 406 may include instructions to receive a selection of a respective function for each one of a plurality of different finger actions. The instructions 408 may include instructions to receive a first input from a haptic touch button located along a perimeter of a housing of a device and a second input from a sensor. The instructions 410 may include instructions to translate the first input and the second input into a finger action of the plurality of different finger actions. The instructions 412 may include instructions to execute the respective function that was selected for the finger action.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
   a housing;
   a haptic touch button coupled to a perimeter of the housing;
   a sensor located inside of the housing;
   a processor located inside of the housing and communicatively coupled to the haptic touch button and the sensor, wherein the processor translates a touch input from the haptic touch button and a directional input with a plurality of fingers detected from the sensor into a first finger action to execute a function, wherein the first finger action is selected from a plurality of different finger actions and the haptic feedback is selected from a plurality of different types of vibration that is associated with the first finger action, wherein the first finger action and the haptic feedback associated with the first finger action is customized by a user via a graphical user interface of the apparatus to assign different functions to the plurality of different finger actions; and
   a haptic actuator communicatively coupled to the haptic touch button and the processor to provide a type of vibration associated with a haptic feedback based on the first finger action.

2. The apparatus of claim 1, wherein the sensor comprises a strain sensor.

3. The apparatus of claim 1, wherein the sensor comprises a contactless sensor.

4. The apparatus of claim 1, wherein the processor executes a function associated with the finger action.

5. The apparatus of claim 1, wherein the finger action comprises a touch movement.

6. A method, comprising:
   receiving, by a processor of an apparatus, an assignment of different functions and different types of vibrational haptic feedbacks to a plurality of different finger actions customized by a user via a graphical user interface of the apparatus;
   receiving, by the processor, a touch input from a haptic touch button located along a perimeter of a housing of a device;
   receiving, by a processor, a directional input with a plurality of fingers detected from a sensor;
   translating, by the processor, the touch input and the directional input with the plurality of fingers detected into a first finger action of the plurality of different finger actions to execute a function of the different functions assigned to the first finger action;
   determining, by the processor, a type of vibrational haptic feedback selected from the different types of vibrational haptic feedbacks that is associated with the first finger action;
   causing, by the processor, a haptic actuator to provide the type of vibrational haptic feedback associated with the first finger action; and
   executing, by the processor, the function associated with the first finger action.

7. The method of claim 6, wherein the directional input with the plurality of fingers detected is detected by a contactless sensor.

8. The method of claim 6, wherein the directional input with the plurality of fingers detected comprises a single finger swipe or a multiple finger swipe.

9. A non-transitory computer readable storage medium encoded with instructions executable by a processor of an apparatus, the non-transitory computer-readable storage medium comprising:

instructions to receive an assignment of a respective function for each one of a plurality of different finger actions customized by a user via a graphical user interface of the apparatus;

instructions to receive an assignment of a respective type of vibrational haptic feedback for each one of the plurality of different finger actions;

instructions to receive a touch input from a haptic touch button located along a perimeter of a housing of a device and a directional input with a plurality of fingers detected from a sensor;

instructions to translate the touch input and the directional input with the plurality of fingers detected into a first finger action of the plurality of different finger actions to execute the respective function assigned to the first finger action;

instructions to control a haptic actuator to provide the respective haptic feedback of a plurality of different types of vibrational haptic feedbacks that was selected for the first finger action; and instructions to execute the respective function that was selected for the first finger action.

10. The apparatus of claim 1, wherein the haptic feedback is to confirm that a correct function assigned to the first finger action is executed.

11. The method of claim 6, wherein the haptic feedback is to confirm that a correct function of the different functions assigned to the finger action is executed.

12. The non-transitory computer readable storage medium of claim 9, wherein the haptic feedback is to confirm that a correct function of the plurality of different functions assigned to the first finger action is executed.

* * * * *